United States Patent [19]

Kohno et al.

[11] Patent Number: 5,478,157
[45] Date of Patent: Dec. 26, 1995

[54] PRINTING APPARATUS

[75] Inventors: Nobuo Kohno; Yoichi Kobayashi; Hiroaki Takano, all of Kanagawa; Masahiko Yamasaki, Tokyo; Satoru Yamazaki, Tokyo; Toshihiko Konnai, Tokyo, all of Japan

[73] Assignees: Sony Corporation; Copal Company Limited, both of Tokyo, Japan

[21] Appl. No.: 290,622

[22] Filed: Aug. 15, 1994

[30] Foreign Application Priority Data

Aug. 21, 1993 [JP] Japan .................... 5-228277

[51] Int. Cl.⁶ ................................................. B41J 2/325
[52] U.S. Cl. .................. 400/120.02; 400/120.03; 400/120.18; 347/212
[58] Field of Search .................. 400/120.02, 120.03, 400/120.04, 120.1 B; 346/76 PH; 347/175, 176, 212; 427/7, 141, 161, 331, 361; 118/45, 624, 630, 202

[56] References Cited

U.S. PATENT DOCUMENTS

| | | | |
|---|---|---|---|
| 4,378,566 | 3/1983 | Tsukamura | 346/76 PH |
| 4,777,496 | 10/1988 | Maejima et al. | 346/76 PH |
| 4,815,872 | 3/1989 | Nagshima | 400/120 |
| 5,037,218 | 8/1991 | Shimizu et al. | 400/120.04 |
| 5,247,314 | 9/1993 | Stephenson | 400/120.04 |
| 5,248,209 | 9/1993 | Isobe | 400/120.04 |
| 5,297,878 | 3/1994 | Saito et al. | 400/120.02 |

FOREIGN PATENT DOCUMENTS

58-148778  3/1983  Japan .

*Primary Examiner*—Edgar S. Burr
*Assistant Examiner*—John S. Hilten
*Attorney, Agent, or Firm*—Ronald P. Kananen

[57] ABSTRACT

A printing apparatus prevents forgery and alteration through lamination formed on a print surface of a medium in a simple structure, and improves the design effect. In the printing apparatus, a print pattern of one frame is stored in a memory component, on a film sheet F with a thermal transfer head, and a printing medium 37 is coated with the film sheet.

10 Claims, 6 Drawing Sheets

PRINTING APPARATUS

BACKGROUND OF THE INVENTION

1. Field of the Invention

This invention relates to a printing apparatus, and is applicable to, for example, a card printing apparatus for printing a color image on, for example, a card printing medium.

2. Description of the Prior Art

Heretofore, there are card printing apparatuses to print a color image on a card printing medium using the dyestuff thermal transfer system. These types of card printing apparatuses print a color image on a card printing medium (hereinafter called as "card"), onto which dyestuffs are thermally transferred with a thermal transfer head sequentially one upon another, dyestuffs comprising sets of yellow, magenta, cyan, and black dyestuffs applied at an equal pitch on a ribbon, based on color image information read optically from a color photograph or color image information from a video camera (Japanese Patent Application Laid Open No. 11370/1987).

Some card printing apparatuses transfer a film sheet arranged after yellow, magenta, cyan, and black dyestuffs on a ribbon to laminate a card without a specific lamination device. This type of card printing apparatus prints an identification card used, for example, to identify coming and going people, that is, an ID card. In this case, a security problem arises with the ID card.

For example, there are bank cards and credit cards with a holograph on a film laminated on the card surface which are difficult to forge or alter and, hence, these ensure high security. Therefore, the utility of a card printing apparatus increases if an ID card can be printed that is difficult to forge or alter, when the ID card is printed with a card printing apparatus. Including an ID card, the design effect of the usual card printing apparatus increases if, for example, a mat texture can be processed onto a silver chloride photograph to improve the appearance of the printed sample.

SUMMARY OF THE INVENTION

In view of the foregoing, an object of this invention is to provide a printing apparatus for preventing forgery on tampering with a laminated film formed on a print medium in a simple structure, and also improving the design effect.

The foregoing object and other objects of this invention have been achieved by the provision of printing apparatus 20 for executing a predetermined printing on a print surface of a predetermined printing medium 37 with color inks Y, M, C, and K arranged on a ribbon 62, and for transferring a film sheet F arranged after the color inks Y, M, C, and K, on a ribbon 62 with a thermal transfer head 48, wherein; when the film sheet F is transferred with the thermal transfer head, memory means 86 for storing print patterns of a print frame is provided, to coat the print surface of the printing medium 37 while forming the print patterns on the film sheet F through the thermal transfer head 48.

This invention can prevent forgery or tampering with a laminated film formed on a print medium in a simple structure, and also improve the design effect by coating the print surface of the printing medium 37 forming a frame of print patterns stored in the memory means 86 on the film sheet F through the thermal transfer head 48.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
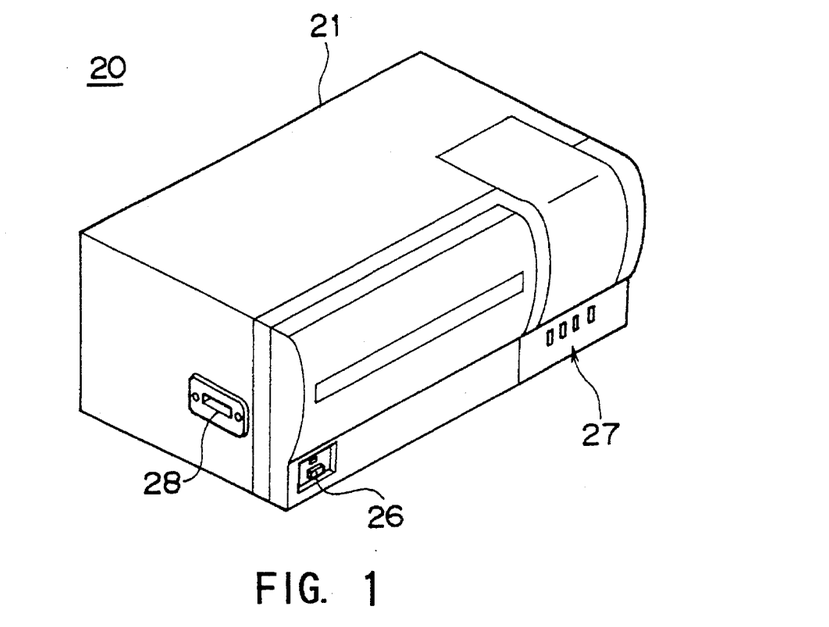
FIGS. 1 and 2 are perspective views showing an external view of an embodiment of the printing apparatus according to this invention.
Figure 2:
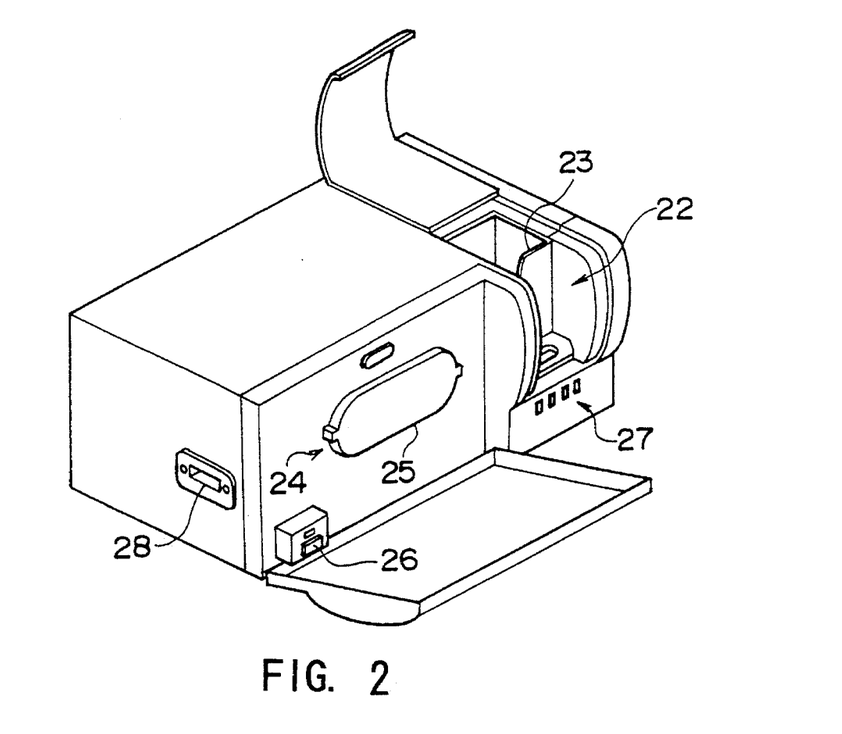

Preferred embodiments of this invention will be described with reference to the accompanying drawings:

In FIGS. 1 and 2, 20 generally denotes a card printing apparatus. A printing assembly, a card transfer assembly, an image processing assembly, and various drive mechanisms are built into a box 21. In front of the box of the card printing apparatus 20, a card cassette insertion port 22 is disposed, and a card cassette 23 with a plurality of cards as print media is set at the card cassette insertion port 22. Additionally, in front of the box 21, a ribbon cassette insertion port 24 is disposed, and a specific ribbon cassette 25 is inserted. Furthermore, in front of the box 21, a power switch 26 and LED indicators 27 indicating the run status of the card printing apparatus 20 are provided. At the opposite side of the box 21 on the side with the card cassette insertion port 22, a card exit 28 is set, from which printed cards are discharged.

Figure 3:
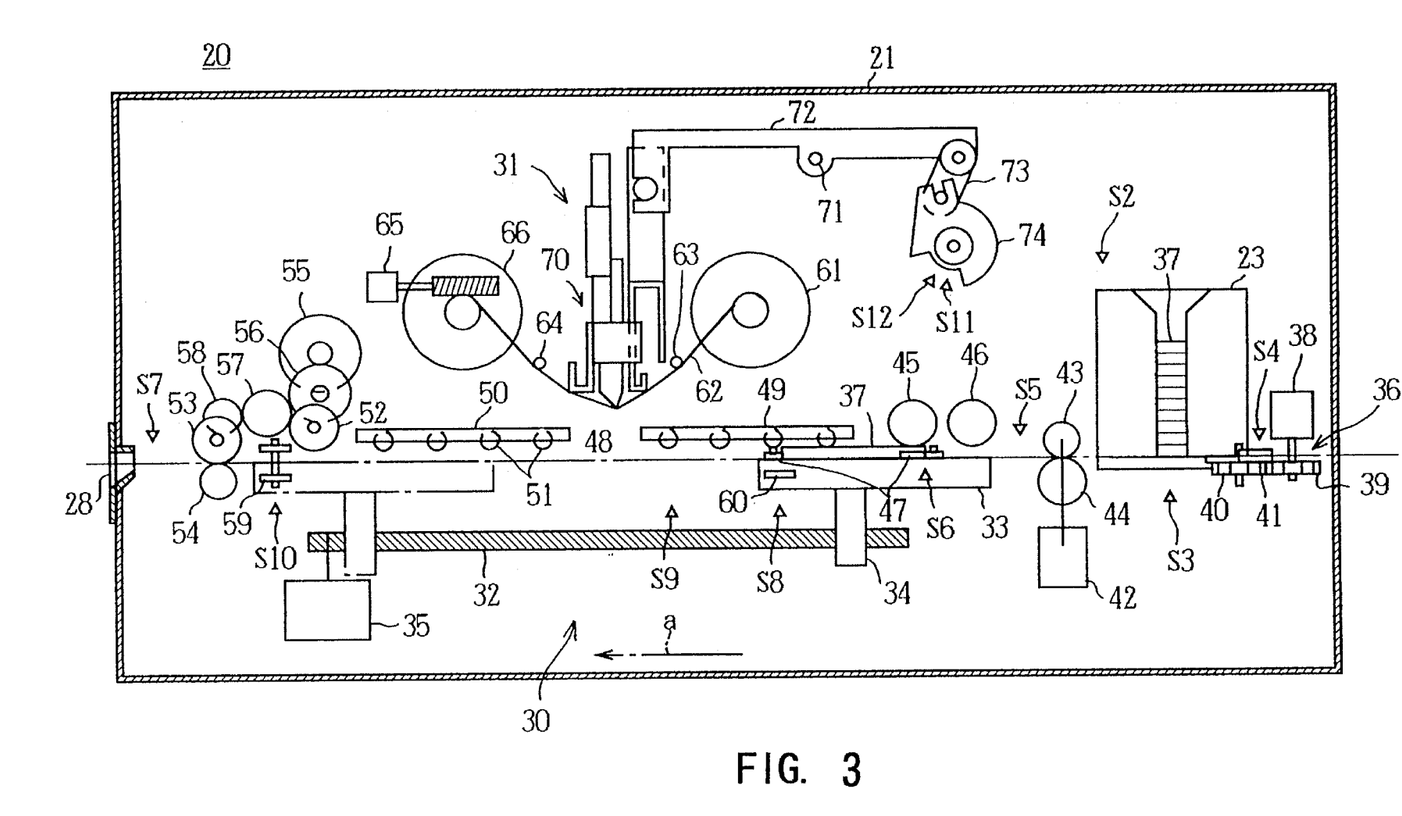
FIG. 3 is a schematic side view showing transfer and printing assemblies in an embodiment of the printing apparatus according to this invention.

The card transfer and printing assemblies of the card printing apparatus 20 are composed as shown in FIG. 3. That is, in the card transfer assembly 30, a ball screw 32 extending in the direction of card transfer shown by an arrow "a" passes through a nut 34 disposed under a transfer table 33, rotating a ball screw 32 by a pulse motor 35, moving the transfer table 33 from the card loading position shown by the solid line in FIG. 3 to the card unloading position shown by the broken line. Then, the transfer table 33 moves horizontally in the same direction shown by the arrow "a" or in the opposite direction, being supported in free sliding by a pair of linear shafts (not shown) provided to extend in the transfer direction shown by the arrow "a".

A card feeder 36 is set near a card cassette 23, feeding cards 37 piled in the card cassette 23 in the direction of the transfer table 33. In detail, the card feeder 36 is composed of a motor 38, a gear 39 driven by the motor 38, another gear 40 meshing with the gear 39, and a semicircular kick plate 41 fixed on the gear 40. By rotating the kick plate 41 in a predetermined interval, the card 37 at the lowest position in the card cassette 23 is kicked toward the transfer table 33.

The card 37 kicked toward the transfer table 33 is pulled between card feeding rollers 43 and 44 driven by a motor 42 through a transfer mechanism (not shown), then fed to the transfer table 33 with a card feeding roller 45 driven by the motor 42. A cleaning roller 46 is disposed between card feeding rollers 43 and 44 and the card feeding roller 45 to clean the print surface of the card 37 prior to printing. Additionally, a card holder 47 is provided above the upper surface of the transfer table 33 to prevent horizontal movement of the card 37.

Furthermore, float prevention materials 49 and 50 fixed to a chassis (not shown) along transfer paths are disposed on both sides of the thermal transfer head 48. Float prevention materials 49 and 50 have a plurality of rollers 51, and rollers 51 contact the card 37 on the transfer table 33, so that the card 37 is prevented from floating off the transfer table 33 during transfer or printing.

Then, after printing, the card 37 is slid in the direction of the arrow "a" on the transfer table 33 by card discharge rollers 52, 53, and 54, and is discharged out the card exit 28. In detail, the card discharge roller 52 rotates clockwise through a gear 56 driven by a motor 55, then discharge rollers 53 and 54 are rotated clockwise through mutually meshing gears 56, 57, and 58 driven by a motor 55, so that the card 37 on the transfer table 33 is slid in the direction of the arrow "a". At this time, prevention of the card 37 by the card holder 47 from moving forward is released with a lever release axis 59 near the transfer table 33.

Moreover, in this card printing apparatus 20, the transfer of the cards 37 and the position of the transfer table 33 are detected by optical sensors, then the card 37 and transfer table 33 are positioned correctly. In detail, a sensor S2 detects whether the card cassette 23 is loaded; a sensor S3 determines whether a card 37 is in the card cassette 23; a sensor S4 determines the rotation position of the kick plate 41; a sensor S5 determines whether the card 37 is fed from the card cassette 23; a sensor S6 determines whether the card 37 is placed on the transfer table 33; and a sensor S7 determines whether the card 37 is discharged.

Still further, each of sensors S8, S9, and S10 detects the position of the transfer table 33, based on a detection projection 60 on the side of the transfer table 33. Thus, the sensor S8 determines whether the transfer table 33 has already arrived at a card pickup position; a sensor S9 determines whether the transfer table 33 has already arrived at the print-start position; and a sensor S10 determines whether the transfer table 33 has already arrived at the card discharge position.

In a print assembly 31, a take-up reel 66 driven by a DC motor 65 takes up a ribbon 62 wound by a supply reel 61, the ribbon being supported by ribbon guides 63 and 64. A torque limiter (not shown) is on the supply reel 61 to provide back tension to the ribbon 62 at a constant torque. A winding diameter detection encoder (not shown) composed of optical sensors is also on the take-up reel 66.

On the ribbon 62, yellow, magenta, and cyan dyestuffs, enough for one frame, are individually applied at a predetermined pitch. Frame-start and winding diameter marks are applied at the start of color dyestuffs each frame on the ribbon 62, and a color identification mark is applied at the start of each color dyestuff to identify the color. Thus, in the printing apparatus 20, each optical sensor (not shown) provided along the feed path of the ribbon 62 detects frame-start, color identification, and winding diameter marks, then feeds ribbon 62 under tension control based on the detected result.

A head unit 70 including the thermal transfer head 48 is set up for easy installation and removal at the end of a pressure lever 72 supported by a freely rotating moving bar 71. The other end of the freely swinging pressure lever 72 is attached to a cam plate 74 through a link 73. Hence, the head unit 70 is raised or lowered with the cam plate 74 driven by a predetermined motor (not shown), and is positioned at the middle position as shown in FIG. 3, the initial position just beyond the ribbon 62 after ascending from the middle position, and the lowest position just touching the card 37 after descending from the middle position.

In detail, the head unit 70 moves to the initial position when the ribbon 62 is loaded, and so on; to the middle position when the card 37 is placed on the transfer table 33; and to the lowest position when the transfer table 33 arrives at the print-start position. Optical sensors S11 and S12 near a notch on the cam plate 74 detect the up and down movement of the head unit 70. The thermal transfer head 48 has a single end face that contacts the entire card 37 vertically. Thus, when the card 37 moves in the direction of the arrow "a", the head prints the desired image onto the printing surface of the card 37.

Figure 4:
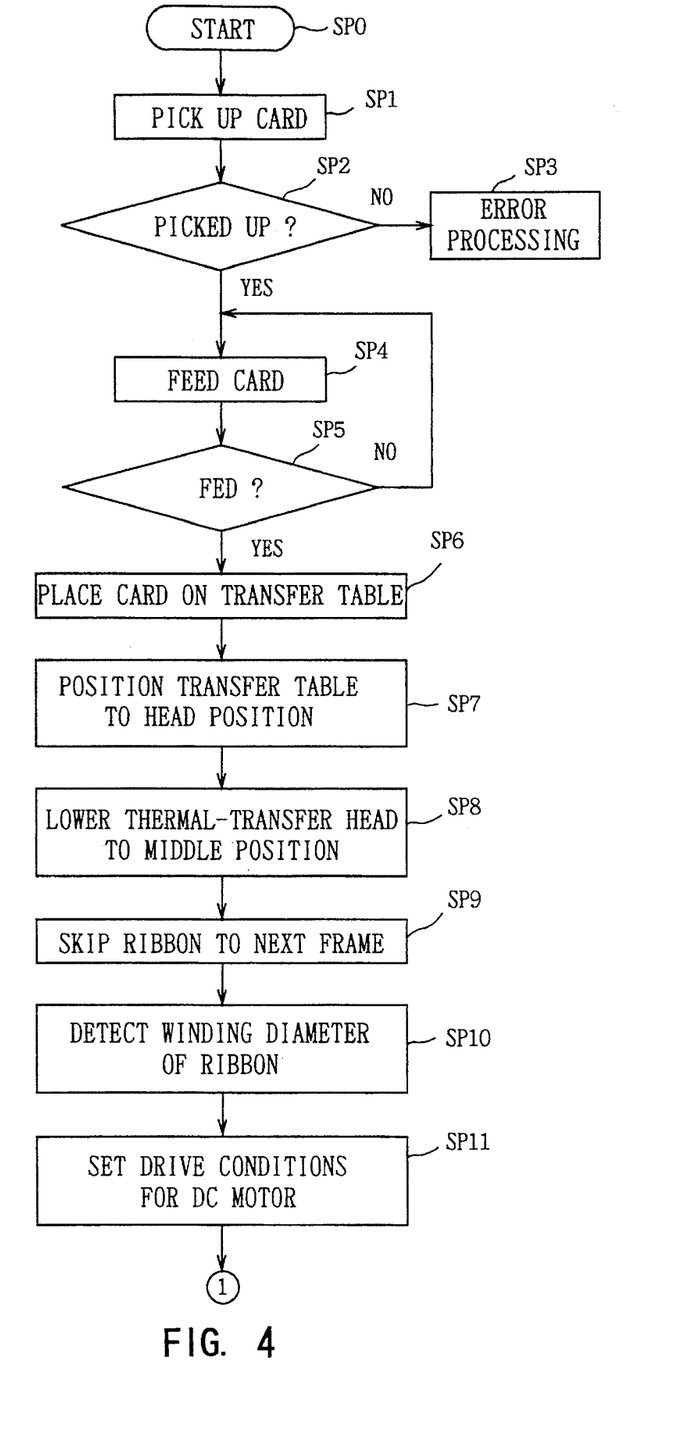
FIGS. 4 and 5 are flowcharts explaining print operations in the card printing apparatus of the embodiments.
Figure 5:
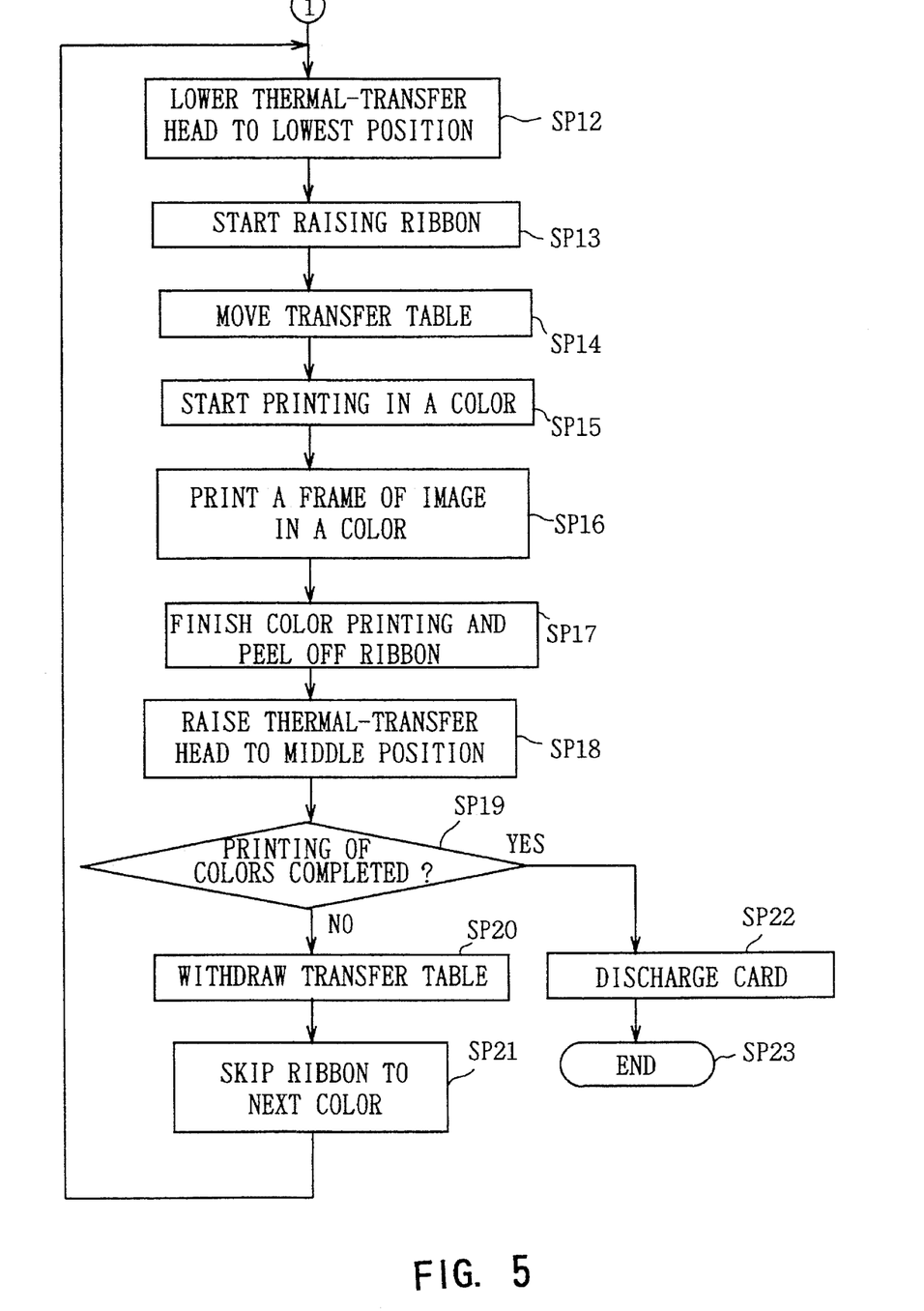

A card printing apparatus 20 actually prints, following a printing procedure step SP0 as shown in FIGS. 4 and 5. In detail, this procedure starts at step SP0, and the subsequent step comprises picking up the card 37 from the card cassette 23 at step SP1; determining at step SP2 whether the card 37 is picked up; and proceeding to step SP3 and performing error processing such as indicating "no card", etc., in the case of a negative result at step SP2.

However, when the card 37 is picked up at step SP2, subsequent steps comprise feeding the card 37 at step SP4 and determining whether the card 37 is fed; repeating step SP4 in the case of a negative result; and proceeding to step SP6 and placing the card 37 on the transfer table 33 in the case of an affirmative result. Step SP7 comprises positioning the transfer table 33 at the thermal printing head 48 and stopping the transfer table 33. The thermal transfer head 48 is in the ascending (initial) position.

Step SP8 comprises lowering the thermal transfer head 48 to the middle position by the cam plate 74 driven by the motor; and skipping the ribbon 62 to the next frame at step SP9. Subsequent steps comprise detecting the winding diameter of the ribbon 62 at step SP10; and setting drive conditions for the DC motor 65 based on the winding diameter detected at step SP11.

Subsequent steps comprise lowering the thermal transfer head 48 to the lowest position by the cam plate 74 driven by the motor at step SP12; starting to take up the ribbon 62 by driving the DC motor 65 at step SP13; and moving the transfer table 33 a predetermined line number ($\alpha$) at step SP14. Subsequent steps comprise starting color printing in one color at step SP15; printing 965 lines of image in a color at step SP16; finishing color printing, peeling off the ribbon 62, and moving the transfer table 33 by a predetermined number ($\beta$) at step SP17.

Subsequent steps comprise lifting the thermal transfer head 48 to the middle position in step SP18; determining whether three colors of printing are completed, at step SP19; withdrawing the transfer table 33 by (965+$\alpha$+$\beta$) lines at step SP20 in the case of a negative result. Subsequent steps comprise skipping the ribbon 62 to the next color at step SP21; and performing another color printing after returning to step SP12. After getting an affirmative result at step SP19, still more steps comprise discharging the card 37 at step SP22; and finishing color printing on the card 37.

Here, the card printing apparatus 20 according to the invention prints a name and photograph of a coming or going person on the card 37, and this means that the apparatus can print an ID card 37 used for personal identification. Additionally, a repeated pattern of predetermined characters, etc., is laminated on the print surface of the ID card 37.

Figure 6:
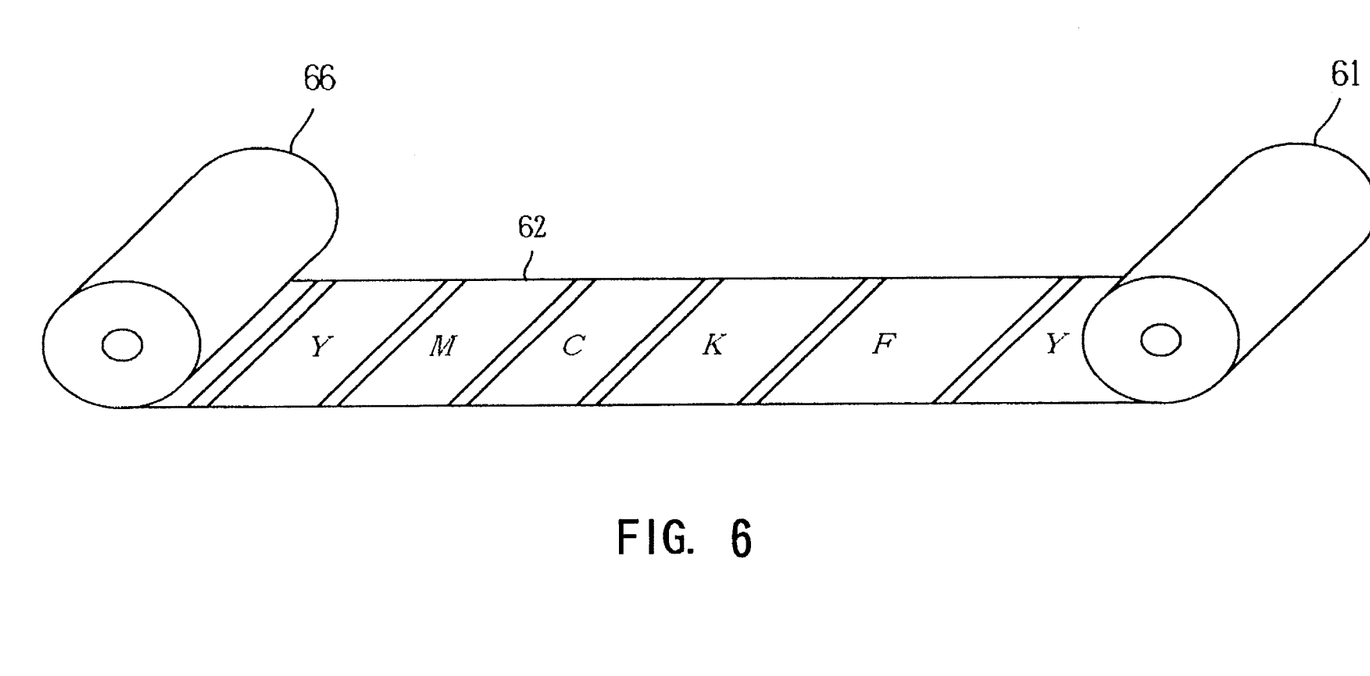
FIG. 6 is a schematic diagram explaining a ribbon used for the card printing apparatus of the embodiments.

In this embodiment, as shown in FIG. 6, a frame of yellow Y, magenta M, cyan C, and black K dyestuffs is applied in each predetermined length to the ribbon 62, followed by a laminated material F consisting of film sheet.

Thus, the apparatus can print an ID card 37 having high security difficult to forge or alter, since the apparatus laminates a repeated pattern of predetermined characters with the thermal transfer head 48 and forms a transparent design with the repeated pattern.

Figure 7:
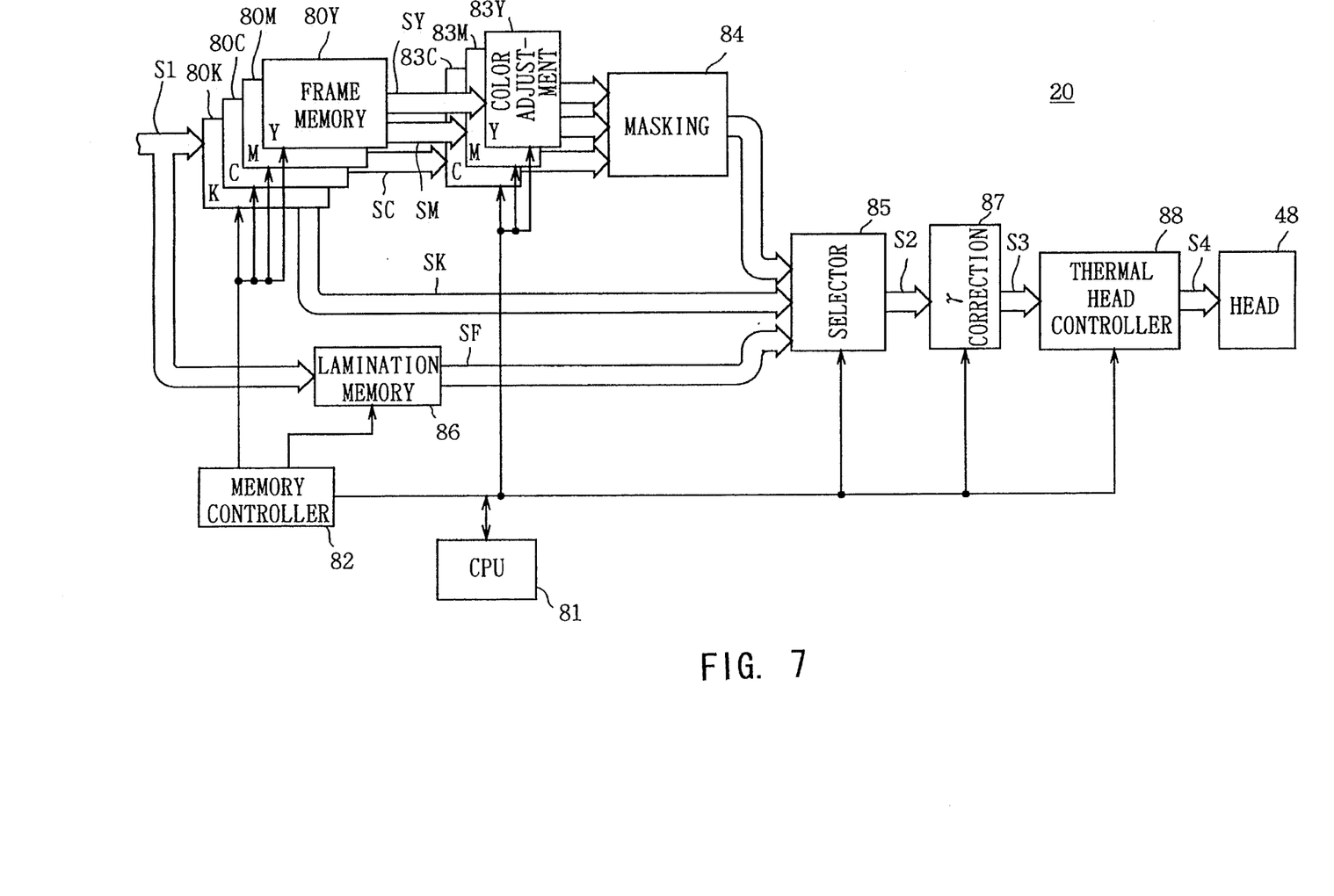
FIG. 7 is a block diagram showing a circuit structure in the card printing apparatus of the embodiments.

Concretely, this card printing apparatus 20 is structured with circuit blocks as shown in FIG. 7. In detail, print data S1 input by a host computer (not shown) are temporarily written by a color in a frame memory 80 (80Y, 80M, 80C, and 80K) having memory capacity for one frame of print images per color. This writing is controlled by a CPU 81 through a controller 82 connected to the CPU 81 via bus.

Print data S1 written to frame memory 80 is read at a predetermined timing by the memory controller 82, wherein color print data SY, SM, and SC corresponding to yellow, magenta, and cyan are adjusted to the user's need through the color control circuit 83 (83Y, 83M, and 83C). A masking circuit 84 corrects differences in dyestuff colors from actual ones through adequately mixing mutually the part of color print data SY, SM, and SC, and outputs corrected color print data SY, SM, and SC to a selector 85. Since the color print data SK for black written in the frame memory 80 need not be adjusted in color and masked, it is read at a predetermined timing, then they are output to the selector 85.

Furthermore, this card printing apparatus 20 according to the invention has lamination memory 86 having the same frame memory as frame memory 80, to which lamination print data SF describing a repeated pattern of predetermined characters formed on the film sheet F is written temporally. Lamination memory 86 is controlled by the memory controller 82 the same as frame memory 80. Lamination print data SF written to lamination memory 86 need not be adjusted in color and masked, and is read in a predetermined timing, then output to the selector 85. Here, if lamination print data SF has only data describing lamination positions, lamination in uniform thickness can be performed and, if data includes density data the same as color print data, lamination in various thicknesses can be performed.

The selector 85 outputs color print data SY, SM, and SC corresponding to yellow, magenta, and cyan; color print data SK for black; and lamination print data SF as a print output data S2 to a γ correction circuit 87, in accordance with the print procedure above in FIGS. 4 and 5. The γ correction circuit 87 performs density-to-live-period conversion, that is, γ correction, by the thermal correction coefficient which is set based on the control of CPU 81, and the resultant print output data S3 is converted to print energy S4 by a thermal head controller 88, then printed with the thermal transfer head 48.

In the above structure, color print data SY, SM, SC, and SK corresponding to yellow, magenta, cyan, and black, and lamination print data SF are input as print data S1 expressing a frame of predetermined print images sequentially from the host computer. Color print data from this is written in frame memory 80 (80Y, 80M, 80C, and 80K), and lamination print data SF is written to lamination memory 86.

Print data SY, SM, SC, SK, and SF written to frame memory 80 and lamination memory 86 is adjusted in colors and masked as required, and output to the selector 85. The selector 85 γ-corrects color print data SY, SM, SC, and SK, and lamination print data SF based on the color printing sequence, then converts it to print energy to supply it to the thermal transfer head 48.

This card printing apparatus 20 can thus print an ID card 37, since this apparatus prints a name and a full-face color photograph used for identification of coming and going people, and also laminates the print surface of the card 37 with a repeated pattern of predetermined characters, etc. Using these, the apparatus can print an ID card 37 having high security and which is difficult to forge or alter, since the apparatus laminates a transparent design in a simple structure with lamination memory 86.

Although the above embodiment has dealt with a case where high security is provided through lamination of a repeated pattern of predetermined characters as lamination print data, lamination print data is not limited to this case, but a check pattern, a predetermined concave/convex pattern, etc., are available, too. Using some of these, this apparatus can perform processing such as mat processing for a silver chloride photograph on a print surface of a medium, and this can improve the design effect of the card itself.

The above embodiment has dealt with a case where a lamination memory for lamination print data is provided in addition to frame memory for color print data. However, if frame memory for color print data is used in time sharing, a similar effect can be attained through also using lamination print data in time sharing. Additionally, frame memory 80K for black is effective as frame memory for color print data, because memory has no need of color adjustment or masking.

Furthermore, the above embodiments have dealt with cases where the card printing apparatus to print predetermined information on a print medium such as an ID card is described as a printing apparatus according to the invention. However, this invention is not only limited to this, but also widely applicable to printing apparatuses to print on paper and other print media.

As mentioned above, the invention can provide a printing apparatus capable of preventing forgery and altering, and improving the design effect through lamination on a print medium in a simple structure, because the invention forms a frame of print pattern stored in a memory means, on a film sheet with a thermal transfer head, and coats the print media with the film sheet.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A printing apparatus for transferring dyestuffs and a transparent laminated material from an ink ribbon to an object to be printed, comprising:

first memory means for storing print data of one frame to transfer dyestuffs;

second memory means for storing lamination data of one frame to transfer transparent laminated material;

control means for controlling the reading of the print data stored in said first memory means and the reading of the lamination data stored in said second memory means;

transfer means for transferring said dyestuffs and said laminated material from said ink ribbon to said object to be printed based on said print data and said lamination data read from said first and second memory means; and selecting means for selectively sending the print data read from said first memory means and the lamination data read from said second memory means to said transfer means.

2. The printing apparatus according to claim 1, wherein said lamination data is composed of position data indicating lamination positions and density data indicating lamination density at each lamination position.

3. The printing apparatus according to claim 1, wherein said first memory means has a plurality of memories to store respective print data corresponding to different dyestuff colors.

4. The printing apparatus according to claim 3, wherein said second memory means is connected directly to said selecting means, and further comprising;

a plurality of color adjusting means for adjusting data levels for print data read from said plurality of memories, each of said plurality of color adjusting means being arranged between said plurality of memories and said selecting means, respectively.

5. The printing apparatus according to claim 3, wherein said second memory means is connected directly to said selecting means, and further comprising;

masking means connected between said plurality of memories and said selecting means for mutually mixing partial print data read from said plurality of memories at a predetermined mixing ratio.

6. The printing apparatus according to claim 3, wherein said second memory means is connected directly to said selecting means, and further comprising:

a plurality of color adjusting means for receiving respective print data read from said plurality of memories, and adjusting data levels of said print data; and masking means connected between said plurality of color adjusting means and said selecting means for mutually mixing partial print data supplied from said plurality of color adjusting means at a predetermined mixing ratio.

7. The printing apparatus according to claim 1, wherein said transfer means is a thermal head.

8. The printing apparatus according to claim 1, wherein said first memory means serves as said second memory means.

9. The printing apparatus according to claim 8, wherein:

said first memory means is composed of yellow memory, cyan memory, magenta memory, and black memory storing print data corresponding to yellow, cyan, magenta, and black respectively; and said black memory serves as said second memory means.

10. The printing apparatus according to claim 9, wherein said second memory means is connected directly to said selecting means, and further comprising:

a plurality of color adjusting means for receiving the print data read from said yellow memory, said cyan memory, and said magenta memory, and adjusting the data levels of said print data; and masking means connected between said plurality of color adjusting means and said selecting means for mutually mixing partial print data supplied from said plurality of color adjusting means at a predetermined mixing ratio.

\* \* \* \* \*